(12) United States Patent
Geurts (10) Patent No.: US 11,155,443 B2
(45) Date of Patent: Oct. 26, 2021

(54) METHOD FOR FORMING A TUBULAR CONSTRUCTION ELEMENT

(71) Applicant: PG Invention B.V., Horst (NL)

(72) Inventor: Peter Johannes Lodewijk Geurts, Horst (NL)

(73) Assignee: PG INVENTION B.V., Horst (NL)

( * ) Notice: Subject to any disclaimer, the term of this patent is extended or adjusted under 35 U.S.C. 154(b) by 0 days.

(21) Appl. No.: 16/999,568

(22) Filed: Aug. 21, 2020

(65) Prior Publication Data

US 2020/0377337 A1  Dec. 3, 2020

Related U.S. Application Data

(62) Division of application No. 14/367,278, filed as application No. PCT/NL2012/050907 on Dec. 20, 2012, now Pat. No. 10,793,395.

(30) Foreign Application Priority Data

Dec. 22, 2011 (NL) ..................................... 2008020

(51) Int. Cl.
  *B66B 9/08* (2006.01)
  *F16L 9/22* (2006.01)
  *G09F 7/00* (2006.01)

(52) U.S. Cl.
  CPC .............. *B66B 9/0846* (2013.01); *F16L 9/22* (2013.01); *G09F 7/00* (2013.01); *Y10T 29/49826* (2015.01); *Y10T 29/49908* (2015.01); *Y10T 29/49945* (2015.01); *Y10T 156/1002* (2015.01)

(58) Field of Classification Search
  CPC ....... B29C 66/4326; F16L 9/22; B66B 9/0846
  See application file for complete search history.

(56) References Cited

U.S. PATENT DOCUMENTS

| 3,291,437 | A |   | 12/1966 | Bowden et al. |
|---|---|---|---|---|
| 4,125,934 | A |   | 11/1978 | Wilson |
| 4,125,973 | A |   | 11/1978 | Lendrihas |
| 4,730,427 | A |   | 3/1988 | Tomsin |
| 4,856,935 | A |   | 8/1989 | Haras |
| 5,007,666 | A |   | 4/1991 | Kyfes |
| 5,145,281 | A | * | 9/1992 | Molyneux ................. E03F 3/06 405/146 |

(Continued)

FOREIGN PATENT DOCUMENTS

| DE | 1951445 B1 | 10/1970 |
|---|---|---|
| DE | 4014069 A1 | 3/1992 |

(Continued)

OTHER PUBLICATIONS

International Search Report for PCT/NL2012/050907 dated Feb. 27, 2013 (5 pages).

(Continued)

*Primary Examiner* — Scott W Dodds
(74) *Attorney, Agent, or Firm* — Shumaker, Loop & Kendrick, LLP (57) ABSTRACT

A tubular construction element and a method for forming a tubular construction element built of longitudinally extending segments in which the segments are joined together in a side-by-side relationship and in which the longitudinal direction of the tubular construction element being greater than the diameter thereof.

19 Claims, 12 Drawing Sheets

(56) References Cited

U.S. PATENT DOCUMENTS

| | | |
|---|---|---|
| 5,265,750 A | 11/1993 | Whiteley et al. |
| 6,658,912 B1 | 12/2003 | Flehmig et al. |
| 2003/0075227 A1 | 4/2003 | Lepoutre |
| 2006/0154026 A1 | 7/2006 | Budworth |
| 2006/0284413 A1 | 12/2006 | Barrera |
| 2008/0072510 A1 | 3/2008 | Wells et al. |
| 2009/0293979 A1 | 12/2009 | Scott |
| 2014/0183330 A1 | 7/2014 | Simmons et al. |
| 2015/0059965 A1 | 3/2015 | Geurts |
| 2016/0236906 A1* | 8/2016 | Horton .................. B66B 9/0846 |

FOREIGN PATENT DOCUMENTS

| | | |
|---|---|---|
| EP | 0446006 A1 | 9/1991 |
| EP | 1449801 A1 | 8/2004 |
| GB | 2094860 A | 9/1982 |
| JP | S62170889 A | 7/1987 |
| JP | H11116161 A | 4/1999 |
| NL | 1030831 C1 | 7/2007 |
| WO | 9405860 A1 | 3/1994 |

OTHER PUBLICATIONS

Written Opinion of the International Searching Authority for PCT/NL2012/050907 dated Feb. 27, 2013 (4 pages).
Office Action for JP Pat. App. No. 2014-548711 dated Sep. 27, 2016 (14 pages including English translation).

\* cited by examiner

METHOD FOR FORMING A TUBULAR CONSTRUCTION ELEMENT

TECHNICAL FIELD AND BACKGROUND

The present invention relates to a method according to the preamble of claim 1 for forming a tubular construction element, which tubular element is built up of longitudinally extending segments, which segments are joined together in side-by-side relationship, the length in longitudinal direction of said tubular construction element being greater than the diameter thereof.

The present invention further relates to a tubular construction element.

A tubular construction element built up of longitudinally extending segments, which segments are fixedly joined together in side-by-side relationship in longitudinal direction is known, for example from DE 19 51 445 B1. The known tubular construction element is used in the manufacture of sewage pipes. A drawback of the tubular construction element described in DE 19 51 445 B1, however, is the fact that its shape cannot be flexibly adapted, more in particular be bent.

Further tubular construction elements are known from, for example, U.S. Pat. No. 3,291,437, EP 0 446 006 A1 and U.S. Pat. No. 4,730,427 A1.

SUMMARY

The object of the invention is to provide a tubular construction element which on the one hand can be easily bent to a desired shape on site, but which at the same time—once bent to the desired shape—has a high structural bearing capacity. It is in particular an object of the invention to provide a tubular construction element for a guide rail for stair lifts.

According to the invention, this object is achieved with the method according to claim 1 and with the tubular construction element according to claim 11. The use of the movable, joined-together segments of the tubular construction element makes it possible, by applying at least a bending moment to the outer side of the construction element, to simply bend the construction element to the desired shape, after which the construction element can be fixed in the desired shape by fixing each of the segments, i.e. limiting or even substantially preventing movement of the segments relative to each other, so as to obtain a rigid tubular construction.

By dividing a tube into segments or strips in the longitudinal direction, the tube will be easier to bend in all directions. The reason for this is that the moment of bending resistance of the tube is a sum of all the individual parts; because a number of segments are used, there are a number of very small moments of resistance, therefore. This is in contrast to the situation in which the tube is bent from one part. In that situation the moment of resistance is a very large on account of the large amount of stretch and strain relative to the neutral line that develop due to the large fibre distance. The segments can only move in longitudinal direction relative to each other. If such movement is prevented by fixing the strips, the tube will have a moment of resistance as if the tube were in one piece.

In this way it is possible to flexibly form the construction element at the location where the construction element is to be mounted. Forming the construction element no longer needs to take place in a factory environment, therefore, which saves time and costs. Due to the use of the longitudinally extending segments, the tubular construction element can be easily bent in all directions for realising the desired final shape. In addition, bending the tubular construction element requires relatively little force, since the moment of bending resistance between the segments is relatively low in the original shape. By way of comparison, the moment of bending resistance of a conventional one-part tubular construction element is relatively high on account of the required deformation of the tube, which deformation results in strain and stretch.

The method preferably comprises the initial step of forming a tubular construction element from the segments. In a first step, the entire tube is thus formed, which tube can subsequently be bent, after which the segments can be fixed. By forming the entire tube first and only then bending it, it is ensured that the various segments are well-adjusted to each other. Pre-forming the segments is not necessary, so that the segments will fit together at all times. Forming an entire tube furthermore ensures that there will be a high resistance against deformation, such as bending, after the aforesaid fixing.

In order to fix the shape, the segments are each made to be substantially immovable relative to each other in longitudinal direction. Said fixing can be carried out in a number of ways, using different fixation means. It is possible to join the segments together by means of a welded joint and/or a glued joint after bending. Furthermore, connecting elements such as screws, nails and/or tacks can be used for preventing or limiting movement of the segments in longitudinal direction relative to each other. It is also possible to deform the segments by means of a tool after the aforesaid bending. The segments may to that end even comprise specific shapes and/or projections, which are deformed by means of the tool, such that the segments can be made practically immovable relative to each other. In the case of a tubular construction having a relatively small diameter, the segments will plastically deform relatively quickly upon being bent, as a result of which such tubular construction elements will simultaneously be fixed upon being bent. The force that is needed for bending and simultaneously fixing such tubular constructions is smaller than the force required for bending a one-part (homogeneous) tube, because the moment of bending resistance is smaller in the case of the tubular construction according to the present invention.

Depending on the use, it may be desirable for the outer surface of the bent tubular construction element, in its fixed, second form, to correspond substantially to the outer surface of a one-part construction element, i.e. a construction element not comprising any segments. This is for example the case if the construction element is used as a rail for guiding an object, for example a stair lift, in which case a guide of the stair lift moves over the outer surface of the rail. A suitable solution in this case is to realise a glued joint by injecting a glue between the segments or on the inner side of the segments, so that the outer side of the tubular construction element will remain smooth. Furthermore it is possible to increase the internal pressure in the tubular construction element, as a result of which the segments are pressed together in such a manner that the resistance against shifting is increased as a result of the friction between the segments being increased. Special embodiments for obtaining such a smooth outer surface are to increase the air pressure by means of a pump in the interior space of the bent tubular construction element or to fill the interior space with a curable fluid that also expands while curing. Increasing the pressure, for example by means of a fluid, has the special advantage that the pressure, such as the air pressure, can be decreased in a very simple manner, as a result of which the shape of the tubular construction element can be adjusted anew or be corrected. Air pressure and/or fluid pressure can thus be used, for example, for testing a specific shape of the construction element. As an alternative to increasing the pressure from the interior of the tubular construction element it is even possible to place a fixing mechanism in the interior of the tubular construction element, which fixing mechanism can be moved from a first position, in which the tubular construction element can be bent by a user, to a second position, in which the fixing mechanism exerts a pressure on the inner side of the tubular construction element. The fixing mechanism may be controlled electronically or mechanically by a mechanic, for example by means of a spring.

In a special embodiment, a fluid is used for pressurising the interior of the tubular construction element for the purpose of thus fixing said tubular construction element. The use of a fluid is relatively safe and provides the desired fixation already at a relatively small overpressure.

By joining several bent construction elements together, a relatively elongate tubular construction can be provided in a relatively simple manner.

As already explained above, the tubular construction element according to the invention is very easy to bend, and once the desired shape has been realised, the longitudinally extending segments can be fixed relative to each other for forming a rigid tubular construction element. To fix the second shape, the techniques already described in the foregoing can be used on the bent tubular construction element.

Preferably, the segments are joined together with some play by means of a form-locked connection. In this way the tubular construction element can on the one hand be produced in a simple manner by joining the segments together while on the other hand the aforesaid play makes it possible in a relatively simple manner for the segments to be moved in longitudinal direction relative to each other, so that the tubular construction element will be relatively easy to bend.

Several materials can be used in the construction element according to the present invention, possibly in combination with a surface treatment. Using a material having a relatively low coefficient of friction is advantageous when moving the segments one into the other for forming the tubular construction element, and a material having a relatively high coefficient of friction imparts relatively much strength to the tubular construction element. The material that is used preferably comprises an optimised coefficient of friction, therefore, by means of which a strong construction element that is easy to install can be provided. An example of such a suitable material is anodised aluminium, with aluminium having the additional advantage that cold deformation thereof is possible, using relatively little force.

In one embodiment, each segment is provided with a connection projection as well as with a receiving space, which receiving space corresponds as regards its configuration to the configuration of the connection projection. In a special embodiment, the connection projection has the shape of a mushroom, seen in sectional view, which mushroom comprises a stem, a rounded part as well as shoulder surfaces between the stem and the rounded part. Such a shape provides on the one hand a high bearing capacity in the second form, so that an object can be supported by means of the construction element, and on the other hand a tubular construction element that is relatively easy to bend in the original (first) shape.

BRIEF DESCRIPTION OF THE DRAWINGS

Finally, the invention relates to a stair lift that is provided with at least one construction element as described in the foregoing.

The invention will now be described with reference to non-limitative embodiments shown in the appended figures.

FIG. 2b is a sectional view of a segment of the tubular construction element according to the present invention that is shown in FIG. 2a;

DETAILED DESCRIPTION

Like parts are indicated by the same numerals in the various figures.

Figure 1:
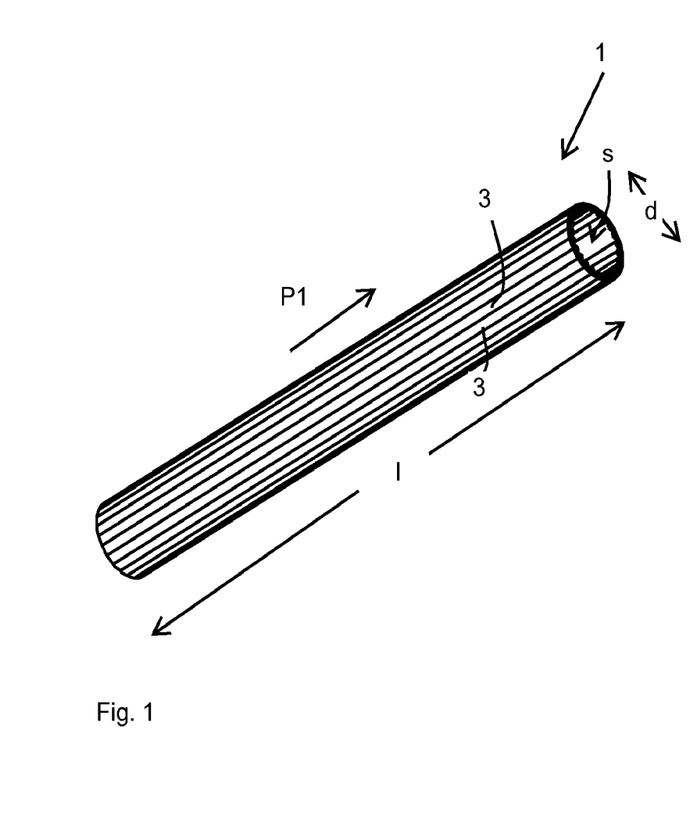
FIG. 1 is a perspective view of a tubular construction element according to the present invention.

In FIG. 1 there is shown a perspective view of a tubular construction element 1 according to the present invention.

The tubular construction element 1 is built up of segments 3 extending in the longitudinal direction (indicated by arrow P1 in FIG. 1). Preferably, the largest possible number of segments 3 is used, in the tubular construction element 1 according to the present invention the minimum number of segments being required is at least ten. The elongated segments 3 are joined together in side-by-side relationship with their long sides. In the tubular construction element 1 according to the present invention, the length l in longitudinal direction of the tubular construction element is furthermore greater than the diameter d.

Figure 2A:
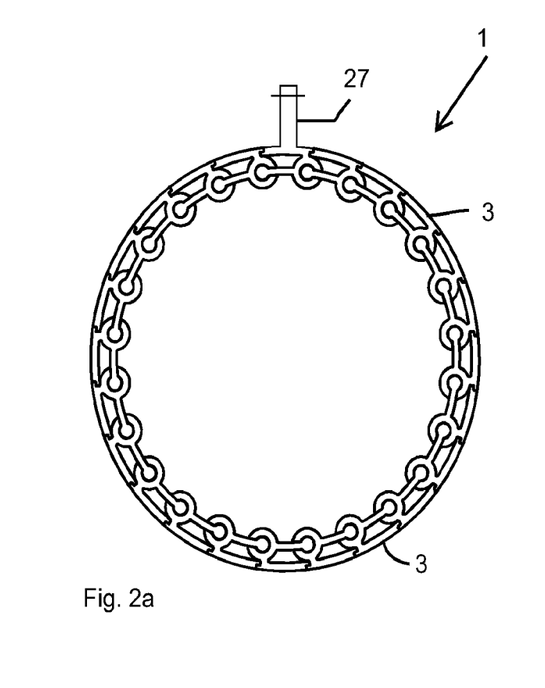
FIG. 2a is a sectional view of a tubular construction element according to the present invention.
Figure 2B:
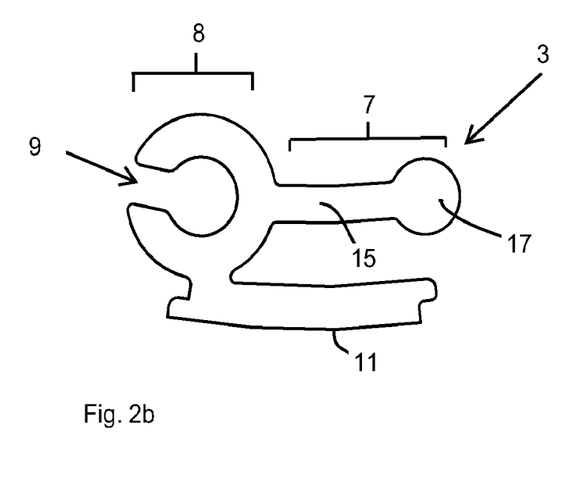

FIGS. 2a, 2b show a sectional view of the tubular construction element 1 according to the present invention and a sectional view of the segment 3, respectively. In the tubular construction element 1, the joined-together segments 3 are movable in longitudinal direction relative to each other. As a result of said movability of the segments 3, the tubular construction element 1 can be bent from an original shape, in which it extends substantially in longitudinal direction as shown in FIG. 1, to a second shape (see FIGS. 5-10), in which the tubular construction element 1 comprises at least one bent part. Said second shape of the tubular construction element 1 can be fixed by the securing the longitudinally extending segments 3 relative to each other, using fixing means. After bending, a welded and/or a glued joint may be used for joining the segments 3 together for the purpose of fixing the second shape of the tubular construction element 1 according to the present invention by means of the aforesaid fixing means. Furthermore, fastening elements such as screws, nails and/or tacks (not shown) may be used as fixing means for preventing or limiting movement of the segments 3 in longitudinal direction relative to each other. Furthermore it is possible to deform the segments 3 by means of a tool (not shown) after bending. To that end the segments 3 may even comprise specific shapes and/or projections (not shown), which are deformed by means of the tool, such that the segments 3 can be rendered substantially immovable relative to each other.

Preferably, fixing means and segment-securing techniques that do not affect the shape of the outer surface of the tubular construction element 1 are used for fixing the second shape of the tubular construction element 1. Various techniques can be used for this purpose, with the use of a pump (not shown) being preferred. Using the pump, the pressure in the interior space 5 of the tubular construction element 1 is changed, normally increased, as a result of which the segments 3 are pressed together so that the resistance against movement is increased as a result of the friction between the segments 3 being increased. A fluid, such as a gas, may be used for this purpose, although the use of a liquid, such as water, is preferable. Using fluid pressure, such as liquid pressure or air pressure, has the special advantage that it is very easy to revert to a situation in which the segments can be moved relative to each other again. If a pump is used, it is preferable if the interior space of the tubular construction element is fluid-tight due to the use of a liner, such as a hose or a flexible covering.

Figure 3:
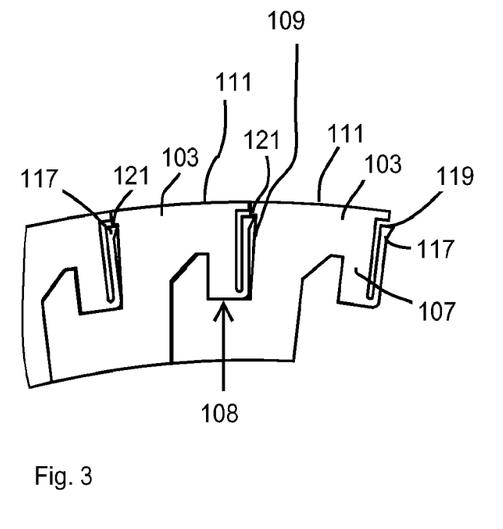
FIG. 3 is a sectional view of an alternative segment of a tubular construction element according to the present invention.
Figures 4A, 4B:
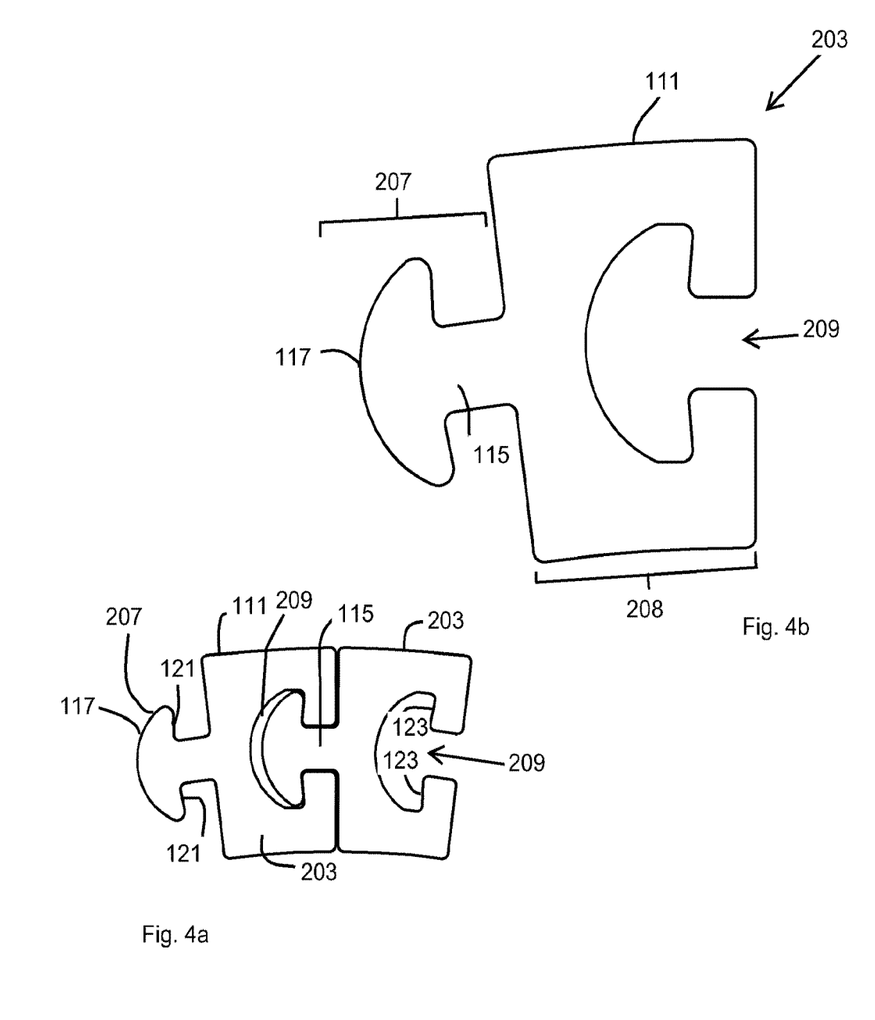
FIGS. 4a and 4b are sectional views of another alternative segment of a tubular construction element according to the present invention.
Figure 5:
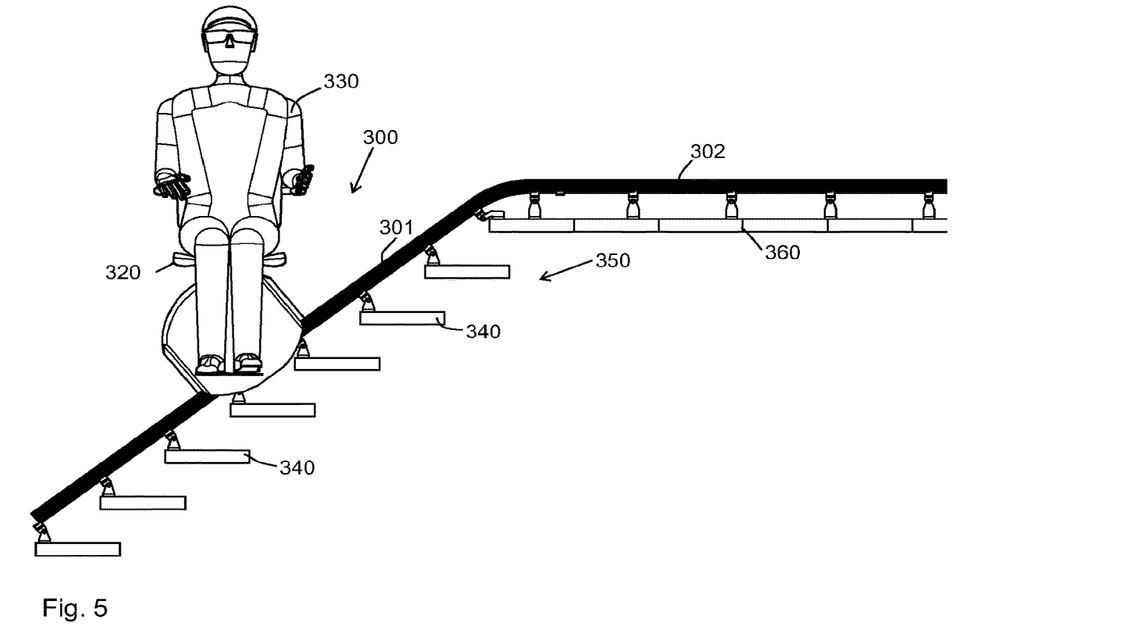
FIG. 5 is a view of a stair lift according to the present invention.
Figure 6:
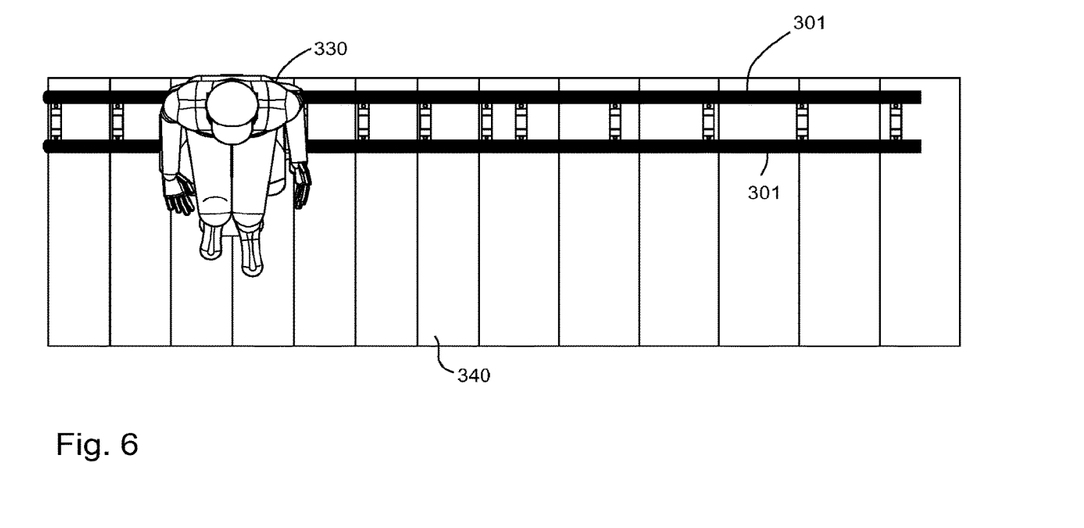
FIG. 6 is another view of the stair lift according to the present invention.
Figure 7:
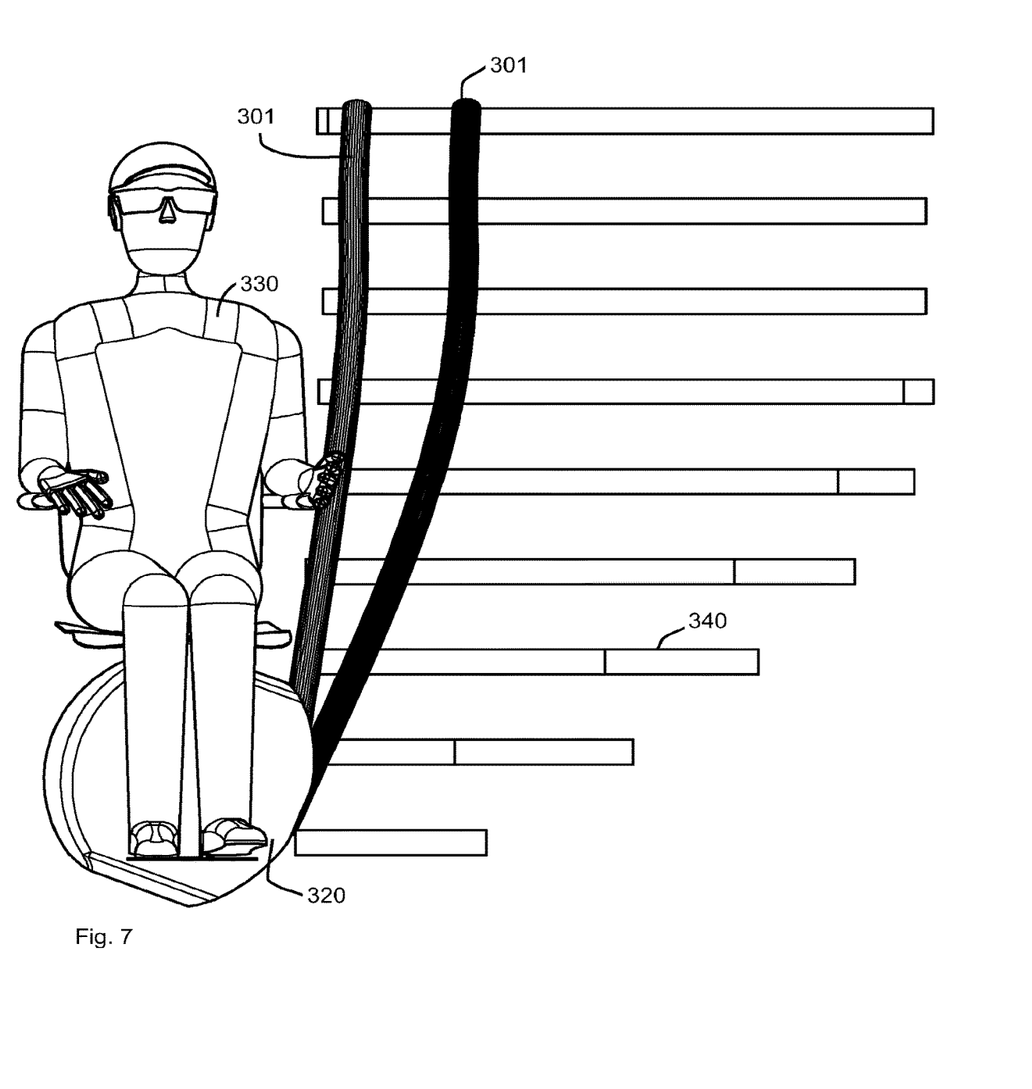
FIG. 7 is another view of the stair lift according to the present invention.
Figure 8:
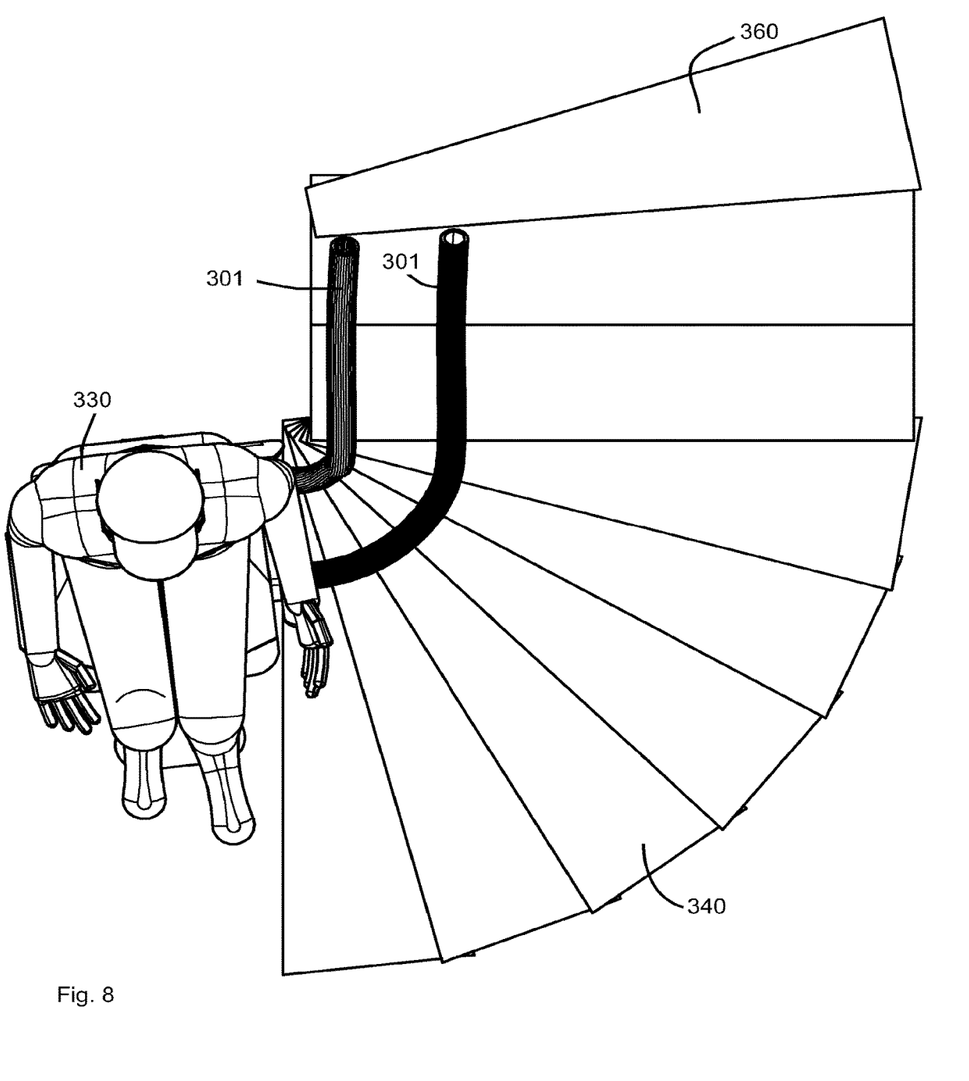
FIG. 8 is another view of the stair lift according to the present invention.

FIGS. 3, 4a,b, and 11 and 12 show alternative embodiments 103, 203 and 603, respectively, of the segment 3 that is shown in detail in FIG. 2b.

The segments 3, 103, 203, 603 are joined together with some play by means of a form-locked connection, each segment 3, 103, 203, 603 being provided with a connection projection 7, 107, 207, 607 and with a connection receiving part 8, 108, 208, 608 defining a receiving space 9, 109, 209, 609, which receiving space 9, 109, 209, 609 corresponds as regards its configuration to that of the projection 7, 107, 207, 607.

Each segment 3, 103, 203, 603 further comprises an outer side 11, 111, 211, 611 facing away from the central axis of the tubular construction element 1, which outer side also forms the outer side of the tubular construction element 1. The outer side of the tubular construction element 1 is made up of the sum of all outer sides of the segments 3, therefore. The segments 3, 103, 203, 603 are dimensioned and configured so that the transitions between the outer sides 11, 111, 211, 611 of the segments 3, 103, 203, 603 are minimal, as a result of which a relatively smooth outer side of the tubular construction element 1 is obtained, over which a guide of a lift (see FIGS. 5-8) can be moved, for example.

In the segment 3 that is shown in FIGS. 2a,b, the connection projection 7 is provided with a stem 15 and a circular (in sectional view) head 17, which extends as a bar in longitudinal direction and which is thickened in comparison with the stem 15. As is shown in FIG. 2a, the segments 3 are joined together by positioning the circular head 17 in the receiving space 9. In the connected condition, the head 17 is accommodated in the receiving space 9 with some play so as to enable the segments 3 to move relative to each other.

In FIG. 3 an alternative segment 103 to the segment 3 is shown, in which the connection projection 107 is provided with a lip 117 having a thickened end 119. The lip 117 is movable against spring force upon joining of the segments 103, with the thickened end 119 of the lip abutting against a projecting part 121 of another segment 103 in the connected condition, so that the segments 103 are firmly joined together.

FIGS. 4a and 4b are sectional views of a third embodiment of a segment 203, in which the connection projection 207 of said segment 203 has the shape of a mushroom, which mushroom comprises a stem 115, a rounded part 117 as well as shoulder surfaces 121 located between the stem 115 and the rounded part 117.

Figures 11, 12:
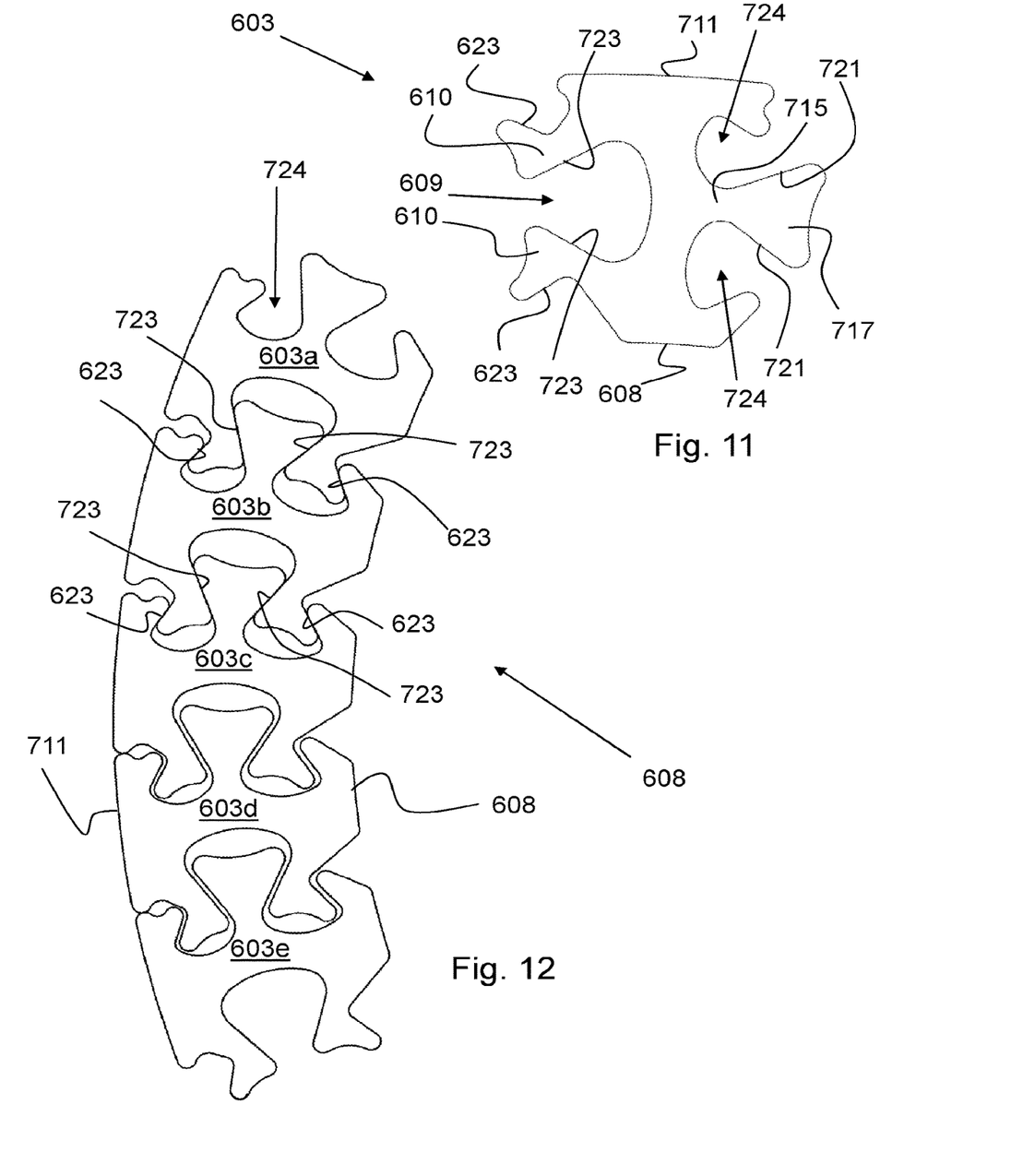
FIG. 11 is a sectional view of a fourth embodiment.
FIG. 12 is another sectional view of the fourth embodiment.

FIGS. 11 and 12 are sectional views of a fourth embodiment of a segment 603, in which an improved resistance against shifting is obtained and an improved maximum pressure load is obtained. On the right-hand side the segment comprises the connection projection 607, with a stem 715 and a rounded part 717, analogous to the mushroom shape of FIG. 4. Shoulder surfaces 721 are provided between the stem 715 and the rounded part 717. On the left-hand side in FIG. 11 the receiving space 709 can be discerned. Provided on the outer side of the receiving space 609 are connecting arms 610, which are also designed to form connection projections 610 associated with receiving spaces 724 near the stem.

As is clearly shown in FIG. 12, the total engagement area is further enlarged in this way, resulting in an improved resistance against shifting in a longitudinal direction. The various segments 603a-e are in engagement with each other, because the two relatively small arms 610 are each in engagement with the associated, relatively small receiving space. The small arms 610 abut with their shoulder surfaces 623, 723 against the shoulder surfaces 723 of the receiving spaces 724. Also the large connection projections 607 are in engagement with the receiving spaces 609, the connection projections 607 also abutting against the walls of the receiving spaces 609 with their shoulder surfaces 721.

The segments 603 can be moved one into another in longitudinal direction. Following that, a complete tube can be made, i.e. all the sections 603 combined already form a complete tube with a complete tube circumference. Subsequently, the interior of the tube thus obtained will be pressurised. As a result, the radius of the tube will slightly increase, i.e. the segments 603 are forced a larger distance apart. As the figure shows, for example for segments 603a and 603b, forcing said segments apart will result in activation of three wedge parts in total, viz. the connection projection 717 and the two connecting arms 610. As a result of said wedging function the arms 610 and the connection projections 717 will be pressed together such that the four (in total) contact surfaces 623, 723, 721, 621 are firmly pressed together, so that a high resistance against shifting is obtained. In addition to that, such an embodiment provides a good resistance against bending.

The segments 3, 103, 203, 603 may further comprise fixing holes, which have preferably been formed in the segments 3, 103, 203, 603 prior to the bending operation. It is even possible to form the fixing holes in the segments prior to the forming of the tubular construction element. The use of the segments makes it possible to form fixing holes spaced a fixed pitch distance apart, or to carry out other operations at points which are still spaced the same distance apart on the outer surface of the tubular construction element after the bending operation. This makes it possible to place a guide component 27 (FIG. 1) in the pre-produced fixing holes after the bending operation.

The segments 3, 103, 203, 603 are preferably made of anodized aluminium. It is also conceivable, however, for the segments to be made of other materials, such as plastic, for example.

Instead of providing a guide component 27 positioned in one of the fixing holes, it is also possible to provide a one-part connecting element (not shown) connected to the segment on the outer side of a segment, which connecting element is for example configured as a mushroom provided with a stem, such as the mushroom 117 and the stem 115 as shown with the segment of FIGS. 4a,b. Connecting elements that mate with the connecting element present on the tube wall of the tubular construction element can in that case be connected to said connecting element in a simple manner.

FIGS. 5-8 show a stair lift 300, in which the above-discussed tubular construction element 1 is used as a rail 301 for guiding the lift 320, on which a person 330 can seat himself. Fastening elements are mounted to each stair 340 of the staircase 350 and to the floor 360 of the next higher level, which fastening elements are connected to the guide component 27 for supporting the rail 301. The rail 301, which comprises bends, is connected to a conventional one-part (homogeneous) tubular or solid rail 302 (see FIG. 5) by means of a connecting element. The conventional rail 302, which does not comprise any bends, is strong and can be produced in a simple manner and thus at low cost. In the illustrated example, two rails 301 are used for supporting the lift 320 to be guided. The rails 301 have been formed as follows from the tubular construction element 1 shown in FIG. 1: in the tubular construction element 1, the joined-together segments 3, 103, 203 are movable relative to each other, with the longitudinal extending segments being moved relative to each other in the longitudinal direction by exerting at least an external force on the tubular construction element 1, for example by means of a bending jig (not shown), such that the tubular construction element 1 is bent from an original shape, in which it extends substantially in longitudinal direction (FIG. 1) to a second shape (FIGS. 5-8), in which the tubular construction element comprises at least one bent part. The rail 301 is provided by fixing the bent shape of the tubular construction element obtained after bending in one of the above-describe ways. In the illustrated example, a pump is preferably used for fixing the longitudinally extending segments relative to each other under the influence of an adjusted, normally elevated, air pressure so as to obtain a rail 301 having a good guide surface.

It is possible in that case, in view of the required length, for each rail 301 to be built up of various construction elements 1 whose ends are connected together so as to provide an elongate, tubular construction in the form of the rail 301.

Figure 9:
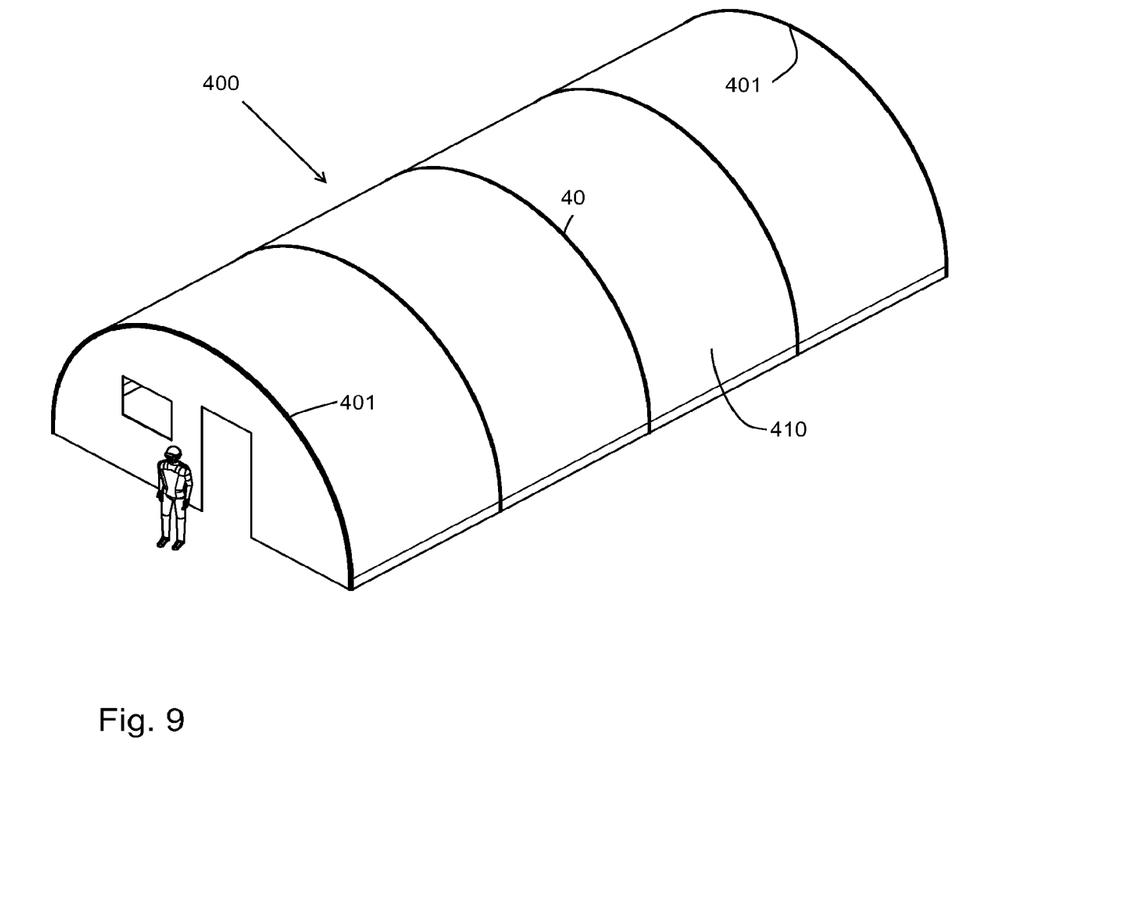
FIG. 9 shows an alternative use of the tubular construction element according to the present invention.
Figure 10:
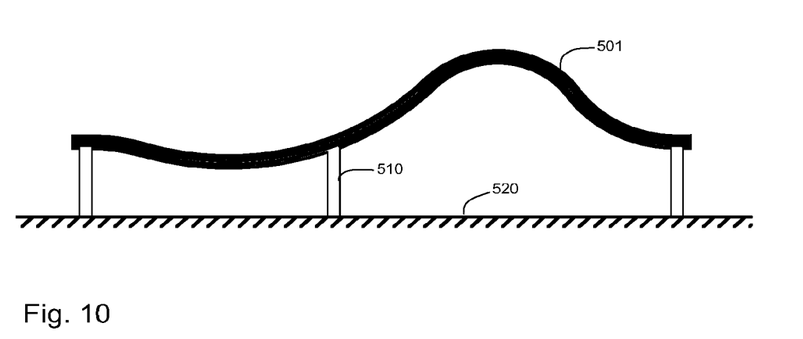
FIG. 10 is a side view of another alternative use of the construction element according to the present invention.

In FIG. 9 there is shown a building 400 whose roof construction 410 is supported by tubular construction elements 401 according to the present invention. In FIG. 10, by contrast, the tubular construction element 501 is used for forming a company logo or the like, which is supported on the ground surface 520 by means of supporting posts 510. The construction element 501 need not have a high bearing capacity.

Both tubular construction elements 401, 501 are shown in the second shape, which has been fixed by securing the longitudinally extending segments relative to each other.

In particular when the construction element 501 is used, it is also possible to apply the pressure on the segments to the outer side of the bent tubular construction element if a guiding outer surface is not needed. In addition to the connecting techniques and the deformation already mentioned before, it is also possible to use a curable liquid for this purpose, which is applied to the outer surface of the construction element by means of a template, which template can be removed once the liquid has cured. Using such a curable liquid, it is moreover advantageously possible to adapt the appearance of the entire tubular construction element.

For certain parts of an elongate construction comprising no bends, few bends or gentle bends, the tubular construction element according to the invention may be combined with conventional one-part (homogeneous) tubes or bars, using connecting means.

The skilled person will appreciate that the invention has been explained in the foregoing with reference to a few preferred embodiments. Many equivalent embodiments are conceivable within the scope of the invention. The scope of the protection is determined by the appended claims.

The invention claimed is:

1. A tubular construction element, comprising:
longitudinally extending segments joined together in a side-by-side relationship,
wherein the length in a longitudinal direction of the tubular construction element is greater than the diameter thereof;
wherein the joined-together longitudinally extending segments in the tubular construction element are configured for bending the tubular construction element from a first shape extending substantially in the lengthwise longitudinal direction, to a second final shape in which the tubular construction element comprises at least one bent portion in which the longitudinally extending segments have been shifted in the longitudinal direction relative to each other and the bent portion extends in a direction having a bent portion axis which forms an angle with the axis parallel to the lengthwise longitudinal direction of the first shape;
wherein each of the longitudinally extending segments are configured to be secured relative to each other in the second final shape by preventing the shifted longitudinally extending segments from moving relative to each other in the longitudinal direction to form a rigid tubular construction element; and
wherein the tubular construction element is a rail of a stair lift.

2. The tubular construction element of claim 1, wherein the tubular construction element comprises fixation means configured to fix the segments of the tubular construction element such that each segment is substantially immovable relative to each other in the longitudinal direction of the tubular construction element.

3. The tubular construction element of claim 1, wherein the tubular construction element comprises at least ten longitudinally extending segments.

4. The tubular construction element of claim 1, wherein the segments have outer sides that when interlocked form a continuous outer diameter of the tubular construction element devoid of recesses.

5. The tubular construction element of claim 1, wherein the longitudinally extending segments are joined together with a degree of play therebetween by way of a form-locked connection.

6. The tubular construction element of claim 1, wherein each longitudinally extending segment includes a connection projection and receiving space, wherein the receiving space corresponds in configuration to the connection projection.

7. The tubular construction element of claim 6, wherein the connection projection includes a lip that is movable against spring force when the longitudinally extending segments are being joined together, and wherein one end of the lip abuts against a projecting part of another longitudinally extending segment when connected.

8. The tubular construction element of claim 7, wherein the connection projection includes a stem and a circular head.

9. The tubular construction element of claim 7, wherein the connection projection is mushroom-shaped and includes a stem, a rounded part, and shoulders between the stem and the rounded part.

10. The tubular construction element of claim 1, wherein interior hollow space of the tubular construction element is fluid-tight with a liner, and wherein pressure in the interior hollow space is configured to be adjusted using a pump for securing the longitudinally extending segments relative to each other.

11. The tubular construction element of claim 1, wherein the longitudinally extending segments include fixing holes formed therein prior to bending the longitudinally extending segments.

12. The tubular construction of claim 1, wherein the tubular construction element when fixed defines an outer surface over which a guide is movable.

13. The tubular construction element of claim 1, wherein the longitudinally extending segments are configured to be fixed relative to each other by one or more of a joint and a connecting element.

14. The tubular construction element of claim 1, wherein the longitudinally extending segments are configured to be fixed relative to each other by deforming the longitudinally extending segments.

15. The tubular construction element of claim 1, wherein the longitudinally extending segments are configured to be fixed relative to each other by a glued joint.

16. The tubular construction element of claim 1, wherein the longitudinally extending segments are configured to be fixed relative to each other by applied pressure.

17. The tubular construction element of claim 16, wherein the applied pressure is achieved using fluid applied under pressure in the interior space of the bent tubular construction element.

18. The tubular construction element of claim 17, wherein the fluid is a curable liquid that presses against the longitudinally extending segments due to expansion while curing such that the longitudinally extending segments are secured relative to each other.

19. The tubular construction element of claim 1, wherein the rigid tubular construction element is hollow.

* * * * *